(12) United States Patent
Gardiner

(10) Patent No.: US 10,293,594 B2
(45) Date of Patent: May 21, 2019

(54) METHOD AND APPARATUS FOR FABRICATING A COMPOSITE OBJECT

(71) Applicant: Laing O'Rourke Australia Pty Limited, North Sydney, New South Wales (AU)

(72) Inventor: James Bruce Gardiner, Chippendale (AU)

(73) Assignee: LAING O'ROURKE AUSTRALIA PTY LIMITED, North Sydney (AU)

( * ) Notice: Subject to any disclaimer, the term of this patent is extended or adjusted under 35 U.S.C. 154(b) by 307 days.

(21) Appl. No.: 15/127,858

(22) PCT Filed: Mar. 23, 2015

(86) PCT No.: PCT/AU2015/050127
§ 371 (c)(1),
(2) Date: Sep. 21, 2016

(87) PCT Pub. No.: WO2015/139095
PCT Pub. Date: Sep. 24, 2015

(65) Prior Publication Data
US 2017/0106594 A1 Apr. 20, 2017

(30) Foreign Application Priority Data
Mar. 21, 2014 (AU) .................. 2014901005

(51) Int. Cl.
*B29C 41/20* (2006.01)
*B29C 41/22* (2006.01)
(Continued)

(52) U.S. Cl.
CPC ............ *B33Y 50/02* (2014.12); *B29C 31/042* (2013.01); *B29C 31/044* (2013.01);
(Continued)

(58) Field of Classification Search
CPC ... B29C 31/042; B29C 31/044; B29C 31/045; B29C 41/20; B29C 41/22; B29C 64/10;
(Continued)

(56) References Cited

U.S. PATENT DOCUMENTS 5,143,817 A 9/1992 Lawton et al.
2002/0185782 A1 12/2002 Koch et al.
(Continued)

FOREIGN PATENT DOCUMENTS

EP 3130444 A1 2/2017
TW 561102 B 11/2003
(Continued)

OTHER PUBLICATIONS

Office Action issued in Chinese Patent Application No. 201580024321.8 dated May 18, 2018.
(Continued)

*Primary Examiner* — Leo B Tentoni
(74) *Attorney, Agent, or Firm* — Marshall, Gerstein & Borun LLP

(57) ABSTRACT

A method for fabricating a composite object with a computer-controlled apparatus, and the apparatus therefor. The comprises a reservoir containing liquid, curable first material, means to selectively solidify the first material and means to selectively deposit a second material. The method involves the steps of selectively depositing portions of the second material, and selectively solidifying portions of the first material, such that the solidified portions of the first material and the deposited portions of the second material form the composite object.

25 Claims, 13 Drawing Sheets

(51) Int. Cl.
| | |
|---|---|
| B29C 70/06 | (2006.01) |
| B33Y 50/02 | (2015.01) |
| B29C 31/04 | (2006.01) |
| B29C 64/277 | (2017.01) |
| B29C 64/268 | (2017.01) |
| B29C 70/54 | (2006.01) |
| B29C 64/129 | (2017.01) |
| B29C 70/38 | (2006.01) |
| B29C 64/118 | (2017.01) |
| B29C 64/291 | (2017.01) |
| B29C 64/264 | (2017.01) |
| B29C 64/273 | (2017.01) |
| B29C 64/209 | (2017.01) |
| B29C 64/245 | (2017.01) |
| B29C 64/286 | (2017.01) |
| B29C 64/393 | (2017.01) |
| B29C 64/282 | (2017.01) |
| B29C 64/124 | (2017.01) |
| B29C 70/68 | (2006.01) |
| B33Y 30/00 | (2015.01) |
| B29C 64/135 | (2017.01) |
| B29C 64/165 | (2017.01) |
| B29C 64/20 | (2017.01) |
| B29C 64/386 | (2017.01) |
| B29C 64/40 | (2017.01) |
| B33Y 10/00 | (2015.01) |
| B29K 105/00 | (2006.01) |
| B29K 105/12 | (2006.01) |

(52) U.S. Cl.
CPC .......... B29C 31/045 (2013.01); B29C 64/118 (2017.08); B29C 64/124 (2017.08); B29C 64/129 (2017.08); B29C 64/135 (2017.08); B29C 64/165 (2017.08); B29C 64/20 (2017.08); B29C 64/209 (2017.08); B29C 64/245 (2017.08); B29C 64/264 (2017.08); B29C 64/268 (2017.08); B29C 64/273 (2017.08); B29C 64/277 (2017.08); B29C 64/282 (2017.08); B29C 64/286 (2017.08); B29C 64/291 (2017.08); B29C 64/386 (2017.08); B29C 64/393 (2017.08); B29C 64/40 (2017.08); B29C 70/382 (2013.01); B29C 70/384 (2013.01); B29C 70/541 (2013.01); B29C 70/68 (2013.01); B29C 70/681 (2013.01); B33Y 30/00 (2014.12); B29K 2105/0058 (2013.01); B29K 2105/12 (2013.01); B33Y 10/00 (2014.12)

(58) Field of Classification Search
CPC ... B29C 64/106; B29C 64/112; B29C 64/118; B29C 64/124; B29C 64/129; B29C 64/135; B29C 64/165; B29C 64/20; B29C 64/209; B29C 64/245; B29C 64/264; B29C 64/268; B29C 64/273; B29C 64/277; B29C 64/282; B29C 64/286; B29C 64/291; B29C 64/386; B29C 64/393; B29C 70/06; B29C 70/382; B29C 70/384; B29C 70/541; B29C 70/68; B29C 70/681; B33Y 10/00; B33Y 30/00; B33Y 50/00; B33Y 50/02; B33Y 80/00
USPC ........ 264/255, 259, 308, 401; 425/110, 113, 425/174.4, 215, 289, 375
See application file for complete search history.

(56) References Cited

U.S. PATENT DOCUMENTS

| | | | |
|---|---|---|---|
| 2003/0090034 A1* | 5/2003 | Mulhaupt | B29C 31/045 264/255 |
| 2013/0056672 A1 | 3/2013 | Johnston et al. | |
| 2014/0061974 A1 | 3/2014 | Tyler | |
| 2015/0367576 A1* | 12/2015 | Page | B29C 64/112 264/257 |
| 2018/0207865 A1* | 7/2018 | Tyler | B29C 64/165 |

FOREIGN PATENT DOCUMENTS

| | | |
|---|---|---|
| WO | WO-03035353 A1 | 5/2003 |
| WO | WO-2009019510 A1 | 2/2009 |

OTHER PUBLICATIONS

Extended European Search Report issued in European Patent Application No. 15764969.0 dated Oct. 9, 2017.

* cited by examiner

METHOD AND APPARATUS FOR FABRICATING A COMPOSITE OBJECT

TECHNICAL FIELD

The present invention relates generally to fabricating a composite object comprising two or more materials and in particular, relates to fabricating a composite object from a substantially liquid, curable material with a computer-controlled apparatus.

BACKGROUND TO THE INVENTION

A composite object is typically formed from two or more materials to obtain an advantage from the combined properties of those materials. For example, it is common to fabricate an object such as a bicycle frame from carbon fibre, which is a composite material, as a composite bicycle frame has a beneficial weight to stiffness ratio.

Additive manufacturing, commonly known as 3D printing, is a manufacturing technique used to fabricate objects. An additive manufacturing process typically involves preparing a digital 3D model of the object with computer software, deriving computer instructions from the 3D model which define a series of parallel, planar cross-sections of the object geometry and providing a 3D printer with the computer instructions, which guide the 3D printer to fabricate successive layers of material corresponding with the cross-sections, one on top of another, until all of the object layers are fabricated.

Many different types of additive manufacturing processes exist, the most common being stereolithography (SLA), selective laser sintering (SLS) and fused filament fabrication (FFF). Stereolithography involves tracing the cross-sections of the object on a top surface of a vat of liquid curable photopolymer with a light source (typically being an ultraviolet laser or lamp), causing the liquid photopolymer to cure to a consistent depth where the light source is focused on the top surface. The cured photopolymer forms a layer of the object and is supported on a platform arranged in the vat. After the layer is fabricated, the platform is lowered into the vat by the thickness of the layer, and a second cross-section is traced, forming a second layer which bonds to the first layer. This process is repeated, with successive layers being fabricated and the platform progressively lowering into the vat until the object is fabricated.

Stereolithography offers a number of advantages over traditional manufacturing techniques, such as injection moulding. However, stereolithography, also suffers from a number of drawbacks. For example, there are many occasions where it would be useful to fabricate an object from a composite material, having specific physical characteristics such as increased strength or reduced density, using stereolithogaphy. Past attempts to resolve this have involved adding fillers, such as ceramic or metal particles, to the liquid photopolymer to form a curable suspension which when cured, fabricates a composite object. However, as the curable suspension is largely homogenous, the resulting fabricated composite object has consistent material characteristics throughout the entire part and therefore does not allow specific portions of the composite object to be fabricated having specific, desired properties.

Accordingly, it would be useful to provide a method or apparatus for selectively solidifying liquid curable material which allows a composite object to be fabricated from two or more materials which has different portions having different material properties.

SUMMARY OF THE INVENTION

According to one aspect of the present invention there is provided a method for fabricating a composite object using a computer-controlled apparatus, the apparatus comprising a reservoir containing substantially liquid, curable first material, an activation head for solidifying the first material, and a deposition head in communication with a supply of second material, the activation head and deposition head being movable relative to the reservoir, the method comprising the steps of: receiving, by the apparatus, computer instructions relating to the composite object geometry; moving and selectively operating the deposition head to deposit portions of the second material in specific locations corresponding with the composite object geometry; and moving and selectively operating the activation head to solidify portions of the first material in specific locations corresponding with the composite object geometry; wherein the solidified portions of the first material and the deposited portions of the second material form the composite object.

According to another aspect of the invention, there is provided a computer-controlled apparatus for fabricating a composite object, the apparatus comprising: a reservoir containing a substantially liquid, curable first material; an activation head for solidifying the first material, the activation head movable relative to the reservoir; a deposition head in communication with a supply of second material, the deposition head movable relative to the reservoir; and a controller configured to move and operate the activation head and the deposition head responsive to computer instructions relating to the composite object geometry; wherein the controller moves and selectively operates the activation head to solidify portions of the first material in specific locations corresponding with the object geometry, and moves and selectively operates the deposition head to deposit portions of the second material in specific locations corresponding with the object geometry.

Other aspects are also disclosed.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

The present disclosure relates to a method and apparatus for fabricating a composite object, involving selectively solidifying substantially liquid curable first material and selectively depositing a second material in specific locations, the first material and second material thereby forming the composite object.

Figure 1:
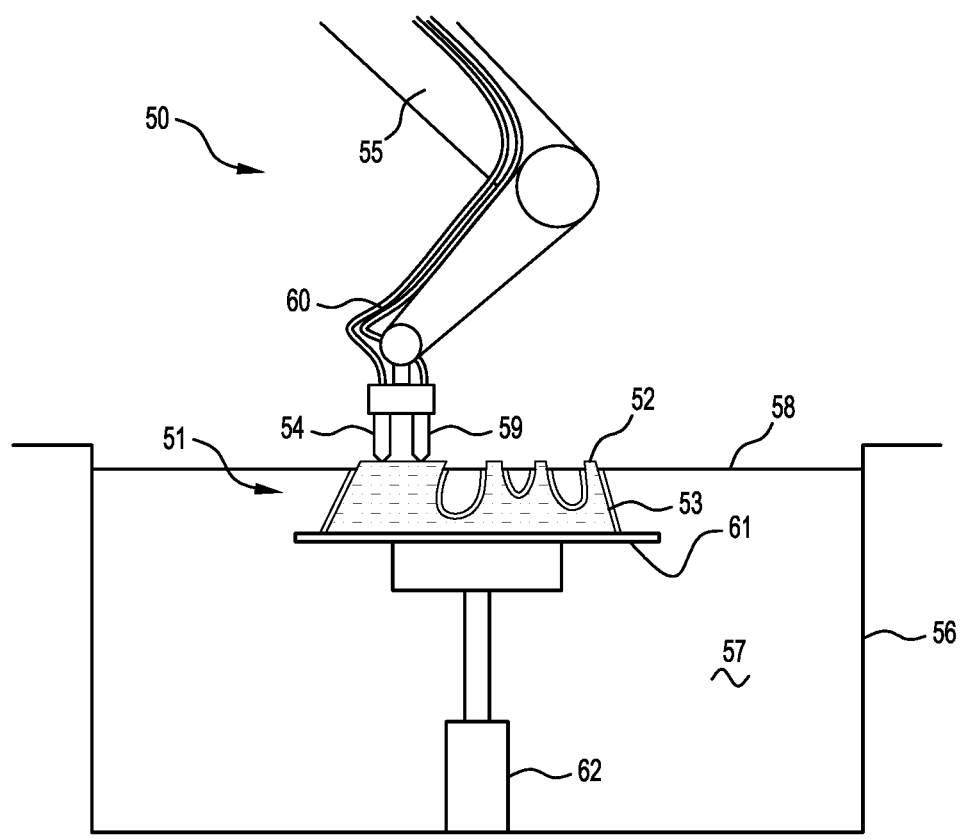
FIG. 1 is a cross-section view of an apparatus fabricating a composite object.

FIG. 1 shows a computer-controlled apparatus 50 fabricating a composite object 51 comprising a core 52 formed integrally with a shell 53. The apparatus 50 has an activation head 54 connected to a robotic arm 55 arranged above a reservoir 56 at least partially filled with a substantially liquid, curable first material 57 defining a top surface 58. The activation head 54 is in communication with an energy source (not shown), such as an ultraviolet laser or lamp, which is suitable for curing the curable first material 57. When operated, the activation head 54 exposes and may also focus the energy source on the reservoir 56. A deposition head 59 is arranged adjacent the activation head 54, the deposition head 59 in communication with a supply of second material via one or more hoses 60. When operated, the deposition head 59 deposits, typically by extruding or jetting, portions of the second material. A platform 61 having at least one surface adapted to support the composite object 50 is connected to a second robotic arm 62 disposed within the reservoir 56. The activation head 54, deposition head 55 and platform 61 are movable relative to the top surface 58 and/or each other by a controller (not shown), responsive to computer instructions relating to the core 52 geometry or shell 53 geometry provided to the apparatus 50. The computer instructions are typically derived from a digital three-dimensional (3D) model of the composite object 51 and define the composite object 51 geometry.

The composite object 51 is fabricated by the deposition head 59 selectively depositing portions of the second material and the activation head 54 selectively solidifying the curable first material 57 in specific locations corresponding with the object 51 geometry. This typically involves initially positioning the platform 61 above the top surface 58 and moving and selectively operating the deposition head 59 to selectively deposit the second material in specific locations corresponding with the core 52 geometry, such that at least some of the deposited second material abuts the platform 61. The platform 61 then moves to at least partially submerge the deposited second material in the curable first material 57, and the activation head 54 moves and selectively operates proximally above the top surface 58 to selectively solidify portions of the curable first material 57 at the top surface 58 in specific locations corresponding with the shell 53 geometry, such that at least some of the solidified portions abut the platform 61 and/or the deposited second material. The platform 61 then moves again, typically lowering into the reservoir 56, to reposition the deposited second material and solidified first material relative to the top surface 58. This process is repeated, selectively depositing further portions of the second material and solidifying further portions of the first material 57 until the core 52 and shell 53 are fabricated, thereby forming the composite object 51.

Optionally, the composite object 51 may be fabricated by initially selectively operating the activation head 54 proximal to the top surface 58 to solidify portions of the curable first material 57 corresponding with the shell 53 geometry, such that the solidified portions abut the platform 61, and then moving the platform 61 to arrange at least some of the solidified portions above the top surface 58. This allows the deposition head 59 to then be selectively operated to deposit portions of second material on the solidified first material and possibly also the platform 61.

Alternatively, the activation head 54 includes a projector (not shown) and projects a cross-section of the shell 53 geometry onto the top surface 58, thereby fabricating an entire layer of the shell 53 from a single projection.

The deposited second material portions and solidified first material portions generally have a predetermined depth and are typically formed as beads. When the core 52 or shell 53 is fabricated in layers, each layer comprises one or more beads. Alternatively, the activation head 22 includes a projector (not shown) and projects a cross-section of the object 21 geometry onto the top surface 26, thereby forming an entire layer of the object 21 from a single projection. The deposition head 59 and activation head 54 may be arranged on separate robotic arms (not shown) and moved and operated simultaneously.

Whilst the activation head 54 typically operates a short distance above the top surface 58 to solidify portions of the curable first material 57 at the top surface 58, it will be appreciated that the activation head 54 may alternatively be submerged within the reservoir 56 and selectively operated to solidify portions of the curable material 57 therein. When this is performed, the activation head 54 may be adapted to form a layer of oxygen across an end thereof to prevent solidified first material bonding to the activation head 54.

Alternatively, the reservoir 56 may have an energy permeable base (not shown), such as having a transparent portion, and the activation head 54 comprise a projector (not shown) arranged under the base. The apparatus 50 is adapted to form a layer of oxygen across the base to prevent cured first material adhering to the base. The platform 61 is suspended from above the reservoir 56 by the robotic arm 62 and has a surface for receiving solidified portions of the curable first material 57 arranged at least initially facing the base. In this embodiment, the apparatus 50 fabricates the shell 53 by the projector projecting cross-sections of the shell 53 geometry through the base, thereby solidifying a layer of curable first material 57 corresponding with each projected cross-section. A first layer of the shell 53 adheres to the platform 61 and each subsequent layer adheres to one or more previous layers. The platform is progressively withdrawn out of the reservoir 56 to move the fabricated layers away from the base. The deposition head 59 and robotic arm 55 may be arranged in the reservoir 56 to aid access to the platform 61 and solidified first material.

The first material 57 and second material typically have different compositions, to allow the core 52 and shell 53 to have different properties. For example, it may be useful to form the core 52 from an electrically conductive material and the shell 53 from an electrically insulating material, thereby allowing electricity to pass through the composite object 51 without requiring wiring whilst allowing the object 51 to be safely handled. Similarly, the composition of the second material may be adjusted by the apparatus 50 during the deposition process to affect the properties of the composite object 51. For example, if the core 52 is fabricated from a foamed material, such as polyurethane foam, the quantity of gas bubbles in the foamed material may be adjusted by the apparatus 50 during the deposition process, thereby allowing different portions of the core 52 to be fabricated having different densities, affecting weight distribution and strength throughout the composite object 51.

Figure 2:
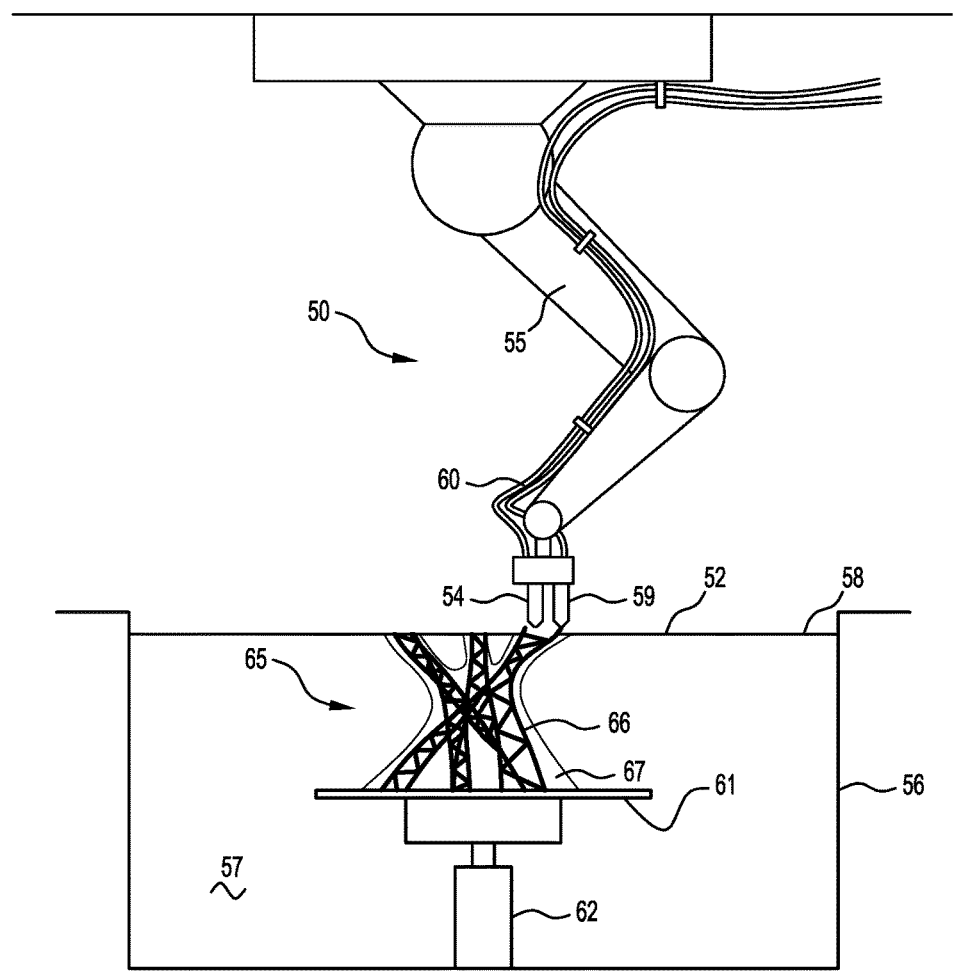
FIG. 2 is a cross-section view of the apparatus shown in FIG. 1 fabricating a different composite object.

FIG. 2 shows the apparatus 50 fabricating an alternative composite object 65 comprising a scaffold 66 and an alternative shell 67. The scaffold 66 is a complex structure, comprising a network of struts and braces, fabricated by the deposition head 59 from a rigid material, such as a metal (or paste having a high metal content), to provide structural reinforcement to the composite object 65. The scaffold 66 and shell 67 are typically fabricated by the apparatus 50 from successive planar layers, beginning with an initial layer which abuts the platform 61 and subsequent layers arranged one on top of another extending away from the platform 61. The progressive fabrication of the scaffold 66 and shell 67 in this way thereby allows each part of the complex scaffold 66 structure to be accessed by the activation head 54 and if required, enclosed by the shell 67.

Figure 3:
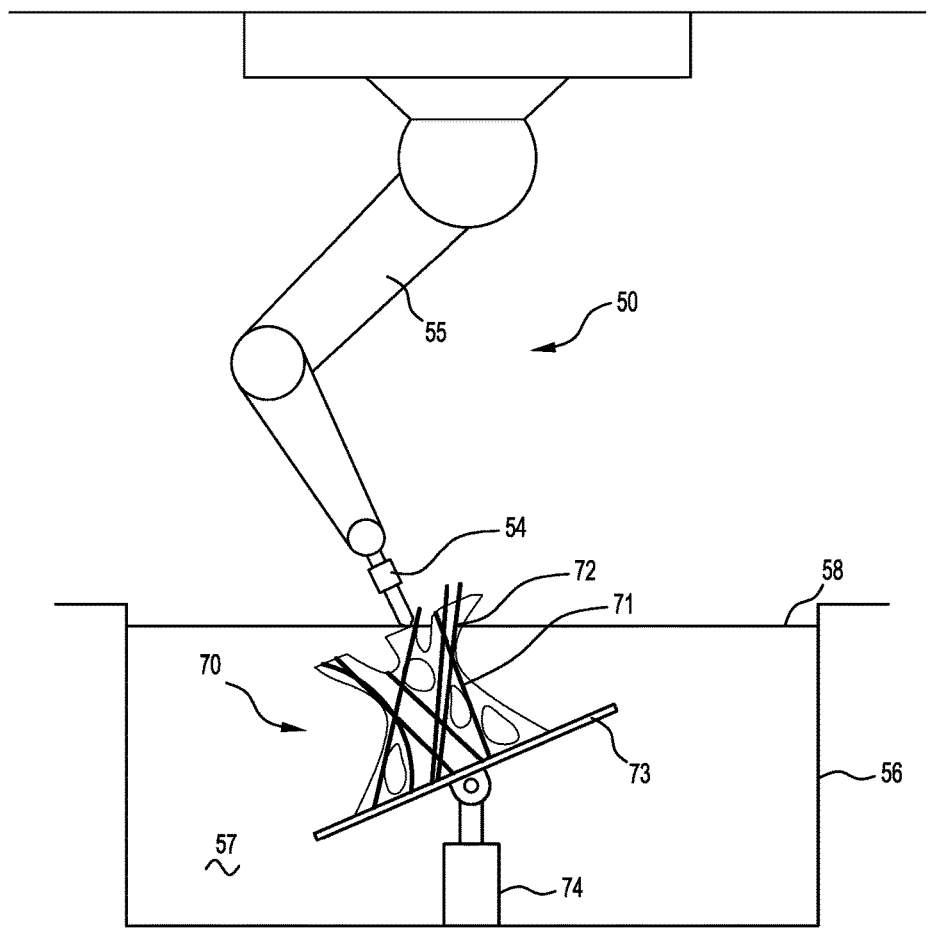
FIG. 3 is a cross-section view of a variation of the apparatus shown in FIGS. 1 and 2 fabricating the object shown in FIG. 2.

In FIG. 3, a variation of the apparatus 50 is shown fabricating a further alternative composite object 70 comprising an alternative scaffold 71, within a further alternative shell 72. The apparatus 50 has an alternative platform 73 rotatably connected to a second robotic arm 74, and is rotatable around at least one axis, and potentially around 3 axes. As the platform 73 is rotatable, the scaffold 71 and core 72 supported thereon can be tilted relative to the top surface 58 during the fabrication process, potentially at the same time as being moved relative to the top surface 58. This allows the activation head 54 to solidify curable first material 57 at the top surface 58 to form non-planar beads or layers, having undulating or double-curved portions. Also, should the platform 73 be positioned by the apparatus 50 such that an axis of rotation extends parallel to the top surface 58, and the activation head 54 be operated simultaneously with the platform 73 being rotated and potentially also moved, ring shaped beads and helical beads can be fabricated by the activation head 54.

Figure 4A:
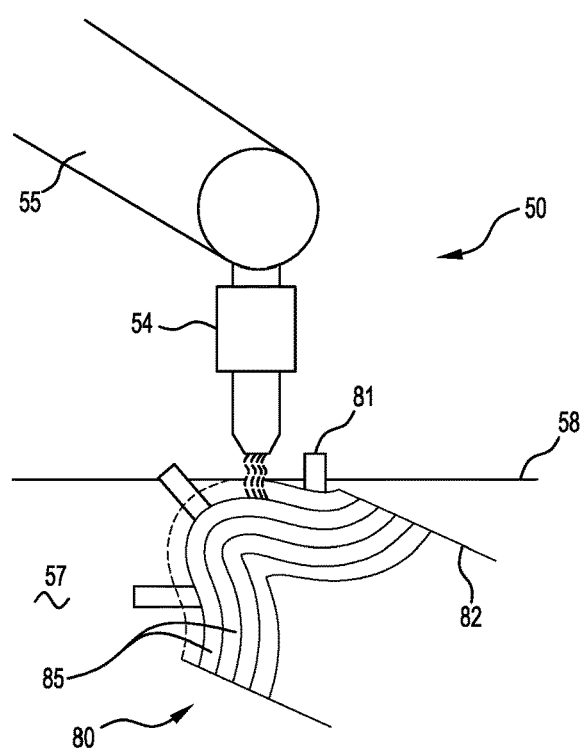
FIGS. 4A and 4B are cross-section views of a further variation of the apparatus shown in FIGS. 1 and 2 fabricating an alternative object.
Figure 4B:
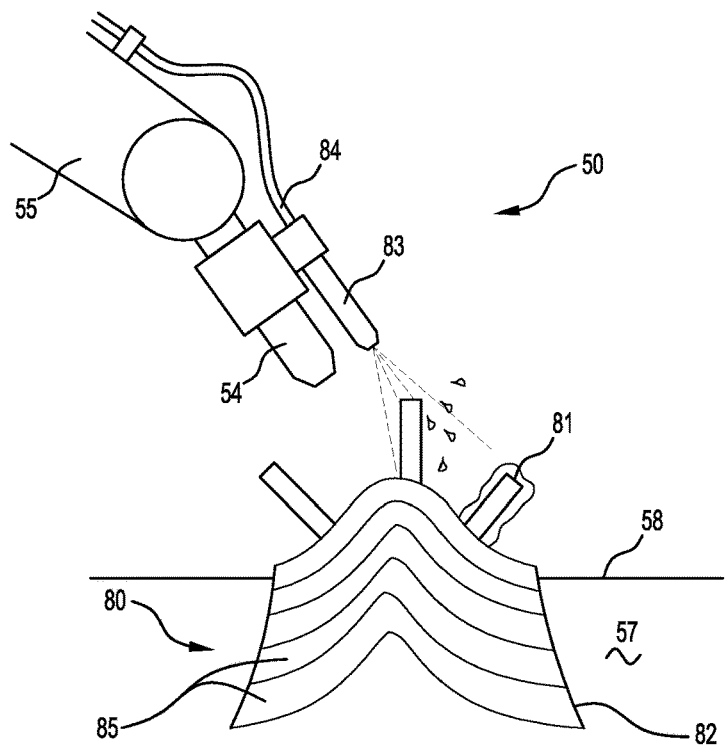

FIGS. 4A and 4B illustrate two stages of the apparatus 50 shown in FIG. 3 fabricating a further alternative composite object 80, comprising a frame 81 formed from second material deposited by the deposition head 59 and a body 82 formed from first material solidified by the activation head 54. The body 82 comprises a plurality of non-planar, curved layers 85 fabricated by operating the activation head 54 and rotating the platform 73 relative to the top surface 58.

In FIG. 4A, the platform 73 is rotated to tilt the composite element 80 and allow the activation head 54 to selectively solidify curable material 57 at the top surface 58, thereby fabricating one of the non-planar layers 85. As a result, a portion of the frame 81 is submerged in the curable material 57. FIG. 4B shows a further aspect of the apparatus 50, where a nozzle 83 in communication with a volume of gas via a hose 84 is attached to the robotic arm 55. The platform 73 is rotated to tilt the composite element 80 upright and the nozzle 83 sprays the portion of the frame 81 covered in curable material 57 with the gas, thereby at least partially removing the curable material 57 from the frame 81 prior to further second material being deposited by the deposition head 59 to fabricate further portions of the frame 81. Alternatively, the nozzle 83 may be in communication with an energy source or supply of chemical agent in order to non-destructively remove liquid first material 57 from the frame 81 prior to further portions of second material being deposited. For example, the nozzle 83 may include an ultrasound emitter to vibrate the frame 81, or may spray a surface tension modifying agent on the frame 81, to remove liquid first material therefrom.

Figure 5:
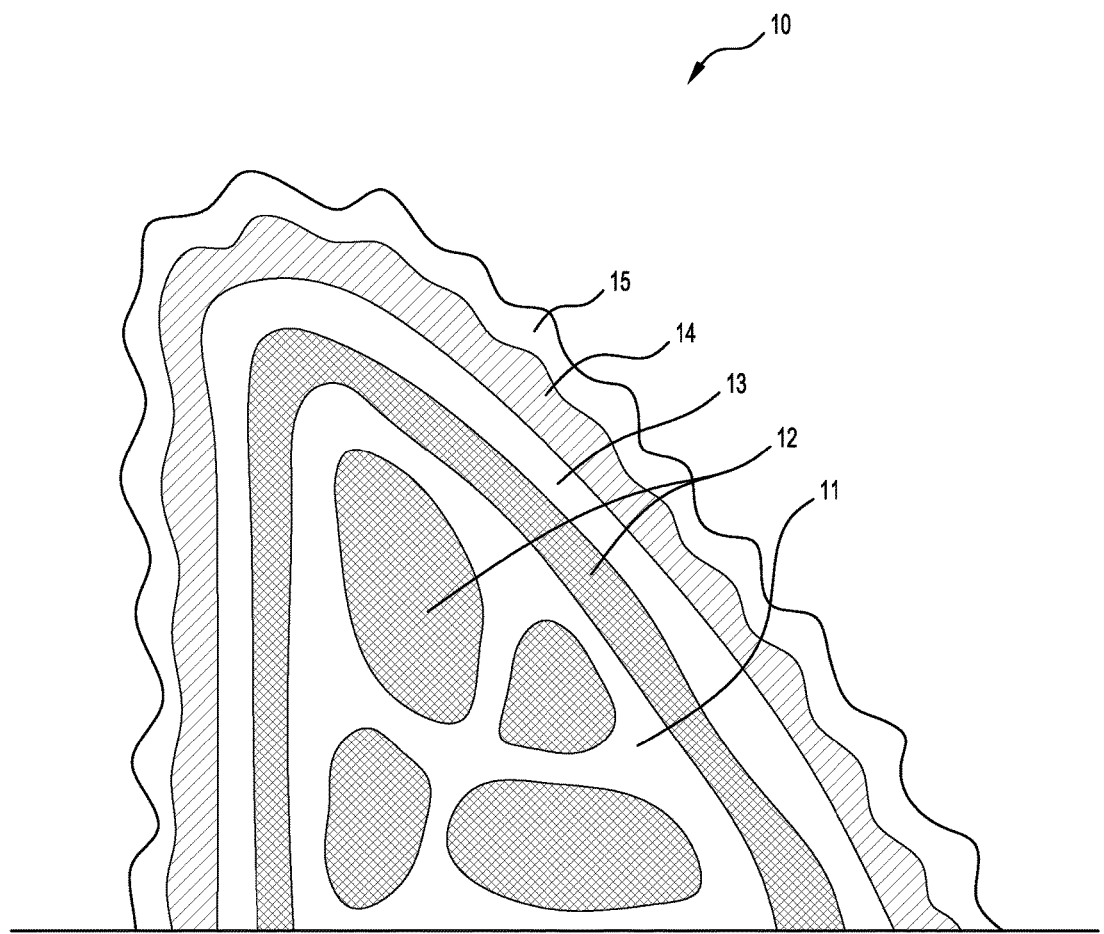
FIG. 5 is a cross-section view of a composite object fabricated by the apparatus shown in any of FIGS. 1 to 4B.

FIG. 5 is a cross-section of a further alternative composite object 10 fabricated by the apparatus 50. The object 10 comprises a plurality of layers enclosing one another, where an inner core 11, outer core 13 and shell 15 are formed from solidified curable first material and an inner filler 12 and outer filler 14 are formed from deposited second and third materials respectively, whereby the deposition head 59 is in communication with a supply of the second and third materials. The first, second and third materials have different properties, thereby allowing the characteristics of the composite object 10 to be tailored to specific functional or aesthetic requirements. For example, if the composite object 10 was intended to act as an impact barrier, the first material 57, when cured, may be a rigid material, such as a ceramic composite, and the second and third materials may be low and high density polyurethane foam. This would allow force transferred through the composite object 10 in an impact to be dissipated in a predictable manner.

Figure 6:
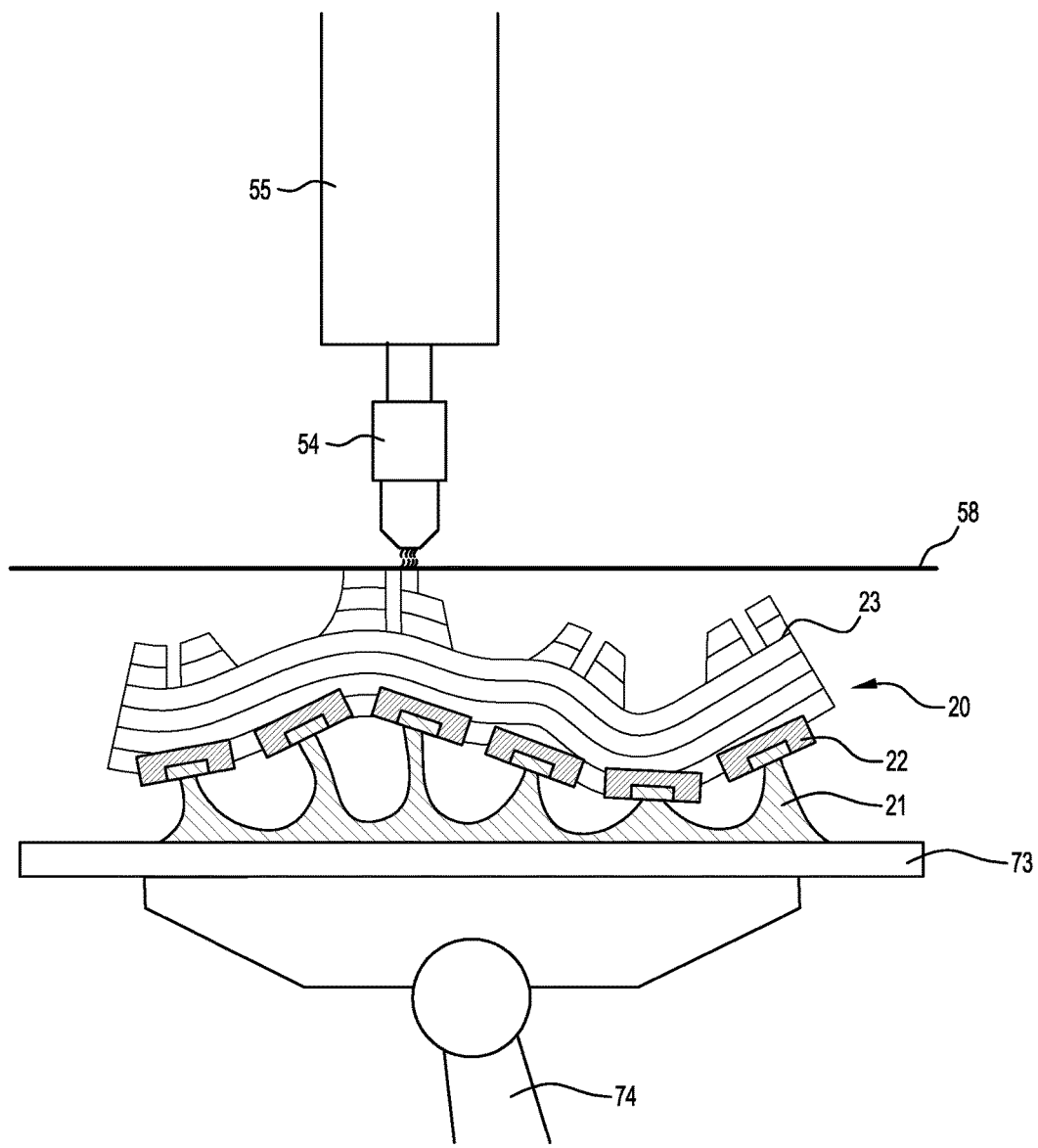
FIG. 6 is a cross-section view of the apparatus shown in FIG. 3 fabricating a further alternative composite object.

FIG. 6 shows a further alternative composite object 20 fabricated by the apparatus 50. The object 20 comprises a support structure 21 arranged on the platform 73, tiles 22 affixed to arms extending from the support structure 21, and a body 23 bonded to the tiles 22. The object 20 is fabricated by initially fabricating the support structure 21 with the deposition head 59 from the second material, whereby the arms are adapted to engage with the tiles 22. The tiles 22 are engaged with the arms. The body 23 is then fabricated by the activation head 54 from non-planar beads of solidified curable first material arranged across the tiles 22, such that each tile 22 bonds with the body 23. Once the body 23 is complete, the composite object 20 is removed from the reservoir, drained and the support structure 21 is removed, exposing the tiles 22 embedded in the body 23. Where the second material is a meltable material, such as a wax compound, this may be achieved by heating the composite object 20 to melt and remove the support structure 21. Similarly, if the second material is a dissolvable material, such as plaster, this may be achieved by submerging the support structure 21 in an appropriate liquid.

Figure 7:
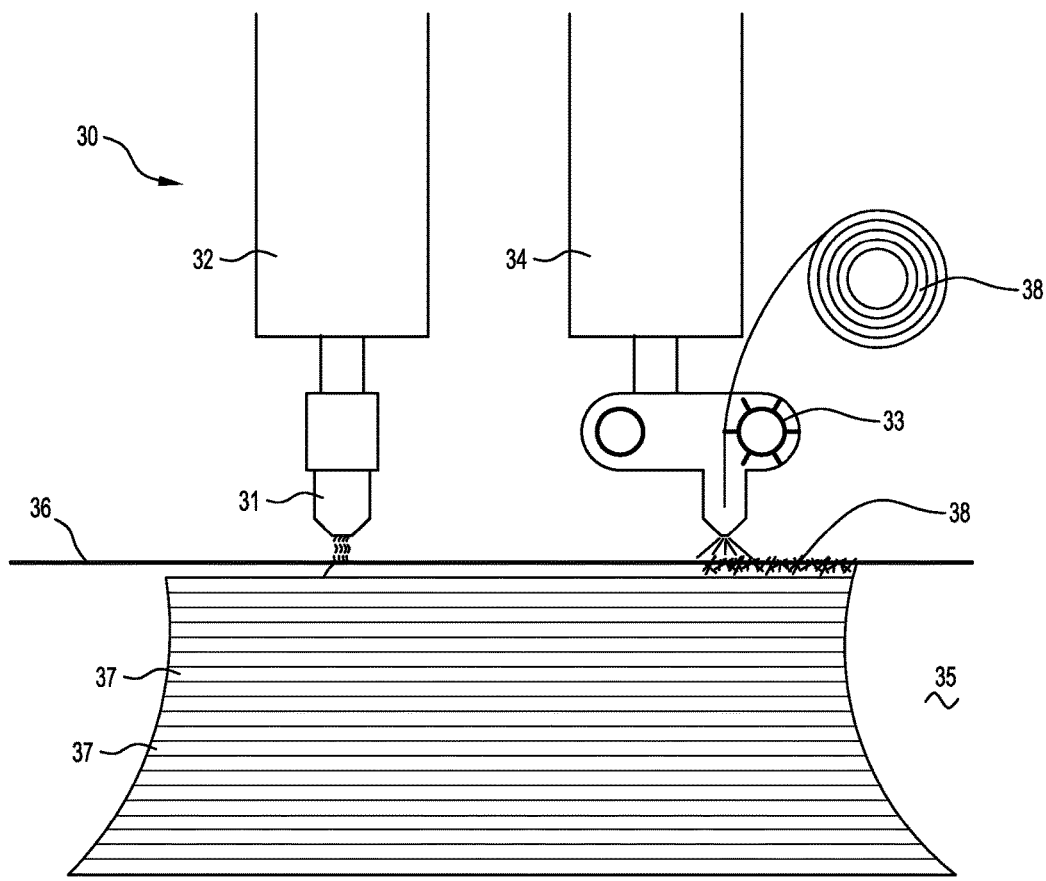
FIG. 7 is a cross-section view of an alternative apparatus fabricating a further alternative composite object.

FIG. 7 shows an alternative apparatus 30 having an activation head 31 connected to a first robotic arm 32 and a deposition head 33 connected to a second robotic arm 34. Both robotic arms 32, 34 are arranged above a reservoir of liquid curable first material 35 forming a top surface 36. The activation head 31 is movable and selectively operable relative to the top surface 36 to selectively solidify portions of the curable first material 35 at the top surface 36, as described above. The deposition head 33 is in communication with a supply of second material, being a reel of fibres 38, and is selectively operable to chop and insert the fibres 38 into the first material 35.

The apparatus 30 is shown fabricating a composite object 39 comprising a plurality of layers 37 and fibres 38. The activation head 31 fabricates the layers 37 by solidifying the first material 35 at the top surface 36 to form beads. The deposition head 33 follows the activation head 31 and sprays chopped fibres 38 into one or more of the beads shortly after being solidified, when the first material 35 is in a 'green' ('gel') state before it hardens. The density of fibres 38 inserted into the beads 37 may be adjusted by the apparatus 30 during the fabrication process, allowing the density and rigidity of each bead 37 to be varied. Optionally, the deposition head 33 may be adapted to adjust the properties of the fibres 38 during or shortly after deposition. For example, this may involve heating polymer fibres 38 to increase rigidity, or heating a shape memory alloy fibre 38 embedded in a bead whilst the first material is in the green state to adjust the shape of the fibre 38 and increase tension between the fibre 38 and the bead.

Figure 8:
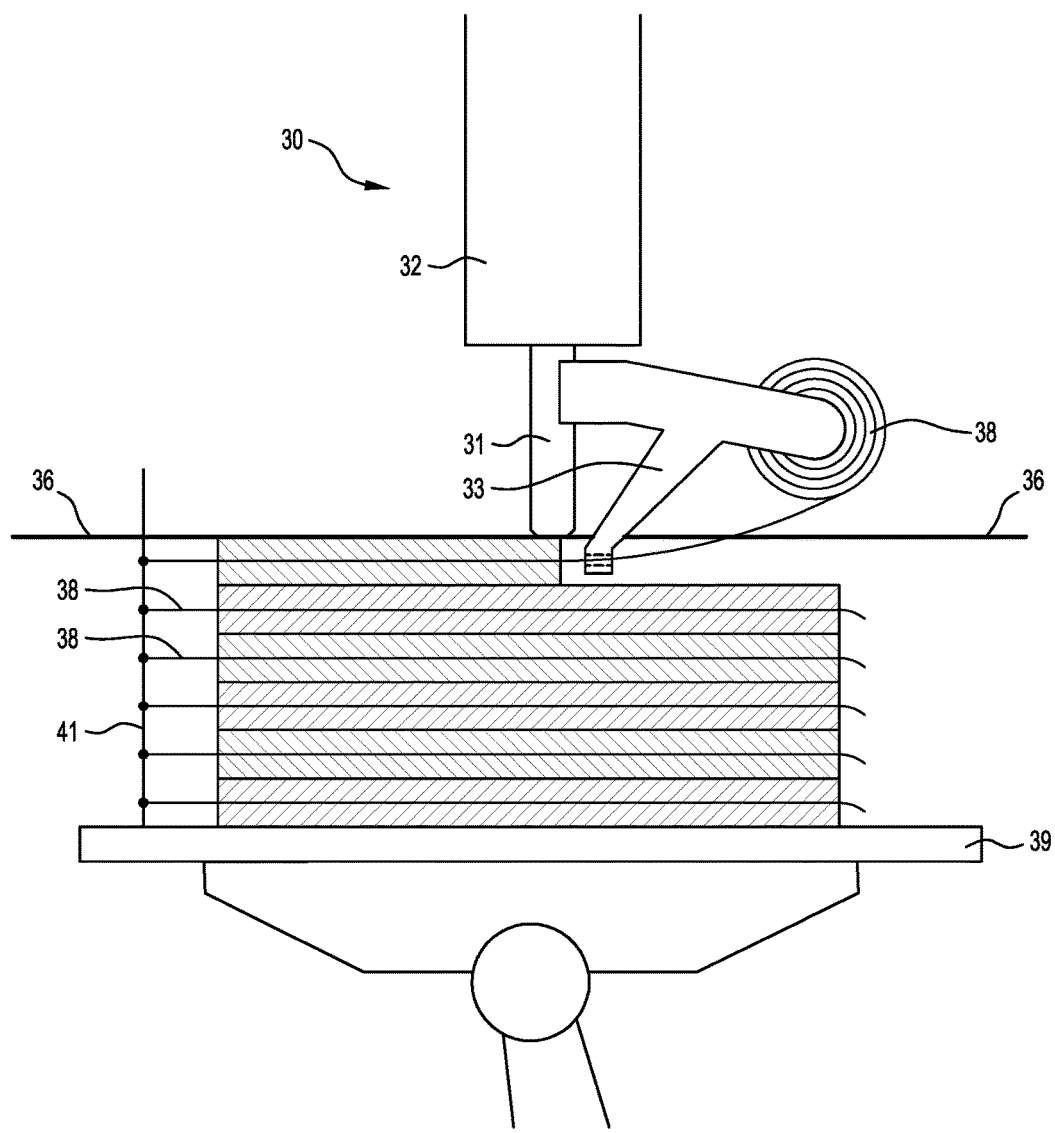
FIG. 8 is a cross-section view of a further alternative apparatus fabricating a further alternative composite object.

FIG. 8 shows a variation of the apparatus 30 fabricating an alternative composite object 40, where the apparatus 30 has the activation head 31 and deposition head 33 connected to the same robotic arm 32. A platform 39 having a support structure 41 extending therefrom is positioned below the top surface 36. During fabrication of the composite object 40, fibres 38 are connected by the apparatus 30 to the support structure 41 and spooled from the deposition head 38. The activation head 31 follows the deposition head 38 and solidifies beads 42 of the curable first material 35 which enclose the fibres 38. This allows one or more continuous fibres 38 to be secured along the length of each bead 42. As the fibres 38 are secured to the support structure 41, tension can be applied to the fibres 38 prior to and during the beads 42 being fabricated, thereby when the beads 42 solidify, the composite object 40 is held under tension. Optionally, a further support structure (not shown) extends from the platform and arranged distally from the first support structure on the other side of the object 40, between which the fibres 39 are secured and tensioned. Preferably the fibres 38 are textured to aid engagement with the beads 42, such as having an array of nodules (not shown) extending therefrom.

Figure 9:
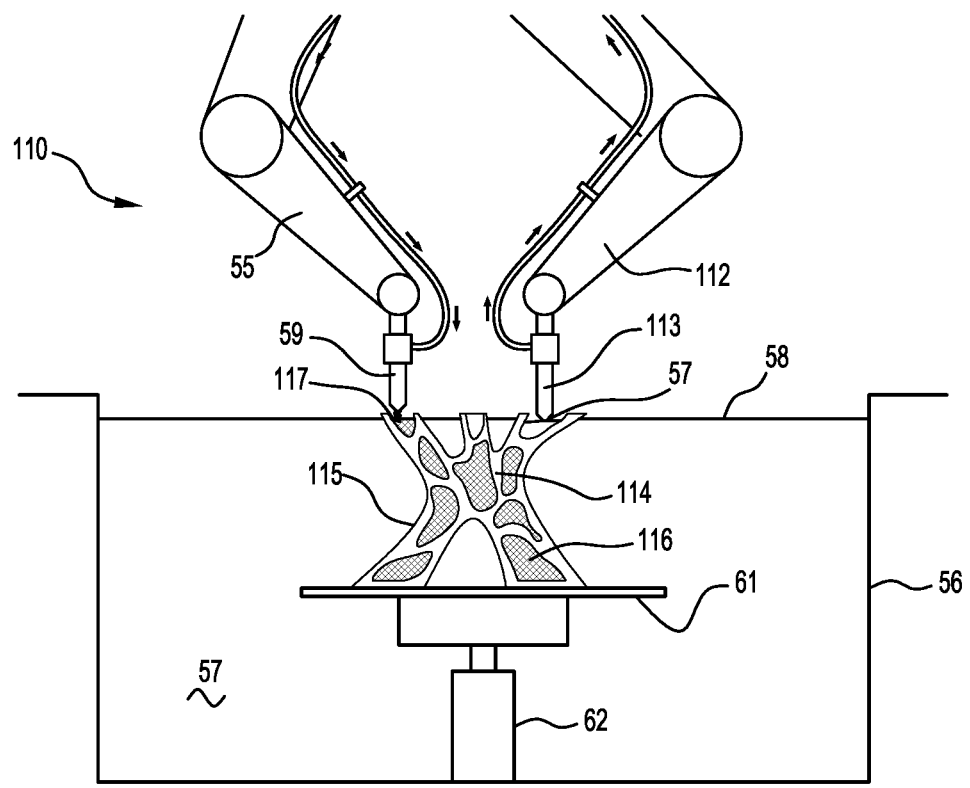
FIG. 9 is a cross-section view of a further alternative apparatus fabricating a further alternative composite object.

FIG. 9 shows a further alternative apparatus 110 sharing many of the features of the apparatus 50. The features sharing the same reference numeral share the same function. The apparatus 110 has two robotic arms 55, 112 movable relative to the reservoir 56. The second arm 112 includes a nozzle 113 connected to a vacuum system (not shown) and is operable to remove liquid curable material 57 from the reservoir 56, responsive to computer instructions.

The apparatus 110 is shown partway through fabricating a further alternative object 114 comprising a body 115 having a plurality of voids 116. The body 115 has been fabricated by the activation head 54 selectively solidifying the curable first material 57, as described above. During fabrication of the body 115, the second robotic arm 112 selectively removes substantially liquid curable material 57 which has become trapped in the voids 116. This then allows the deposition head 59 to selectively deposit second material 117 into the voids 116.

Figure 10A:
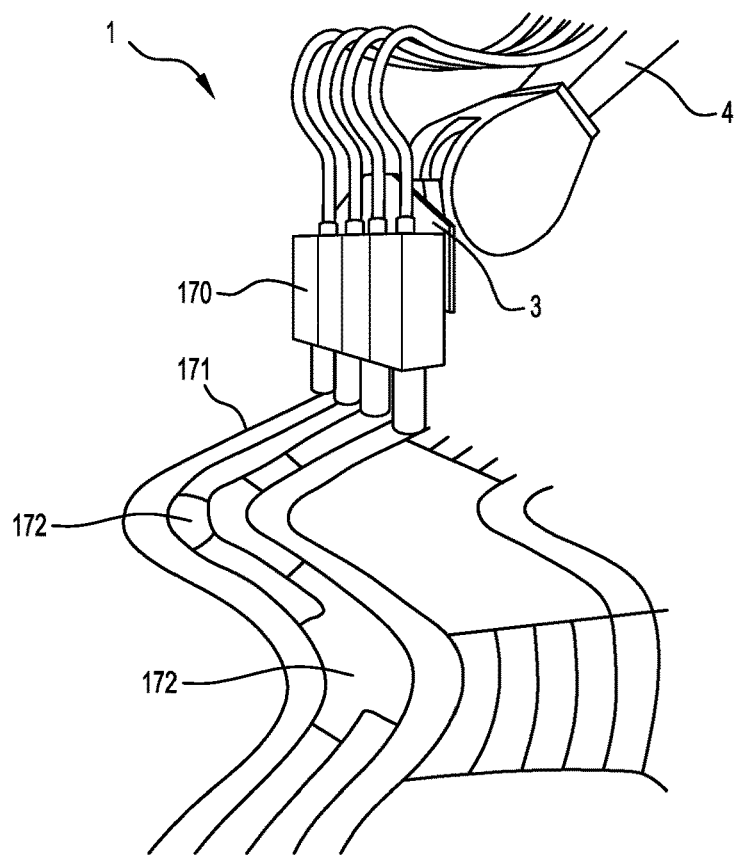
FIGS. 10A and 10B show yet another alternative apparatus fabricating a further alternative object.

FIG. 10A shows a further alternative aspect of the apparatus 50, where the activation head 54 has a plurality of nozzles 170 in communication with the energy source and adapted to selectively focus the energy source on the top surface 58, thereby solidifying portions 171 of the curable material 57. The nozzles 170 are arranged in a linear array and rotatable around an axis arranged by the robotic arm 55 substantially perpendicular to the top surface 58. As the activation head 54 moves across the top surface 58 the separation distance between the nozzles 170 and the top surface 58 is maintained whilst the array of nozzles 170 are rotated relative to the direction the activation head 54 is travelling. The nozzles 170 are selectively operable allowing up to four beads 171 to be fabricated simultaneously. This may involve selectively deactivating some of the nozzles 170 to form cavities 172 between solidified beads 170.

Figure 10B:
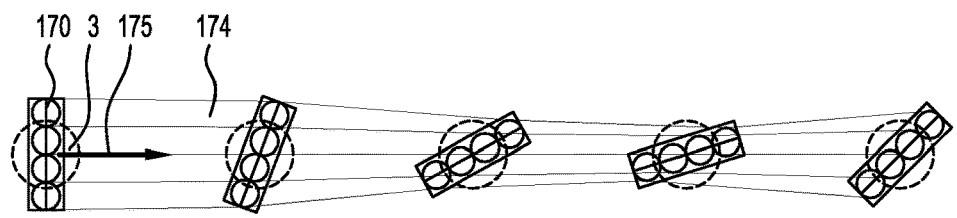

FIG. 10B shows the activation head 54 travelling along a path in a first direction 175 across the top surface 58 and operating each nozzle 170 simultaneously, thereby solidifying a corresponding portion 174 of curable material 57. Whilst moving along the path, the array is rotated relative to the first direction, thereby decreasing the width of the solidified portion 174, allowing the portion 174 to be continuously and smoothly varied in width during fabrication. The intensity of exposure of energy by each nozzle 170 may be varied during the fabrication of the portion 174, providing a constant net exposure intensity and therefore solidify a consistent depth of solidified curable material 174. For example, as the array of nozzles 170 rotates to fabricate a thinner portion, the exposure intensity of all nozzles 170 is decreased. Conversely, when the array of nozzles 170 travels around a curved path (not shown), the nozzle 170 arranged at the outside of the curve exposes at a greater intensity than the nozzle arranged at the inside of the curve. Optionally, the nozzles 170 may be adapted to allow the shape of each nozzle 170 to be adjusted (not shown) and each nozzle 170 to be rotated.

Figure 11:
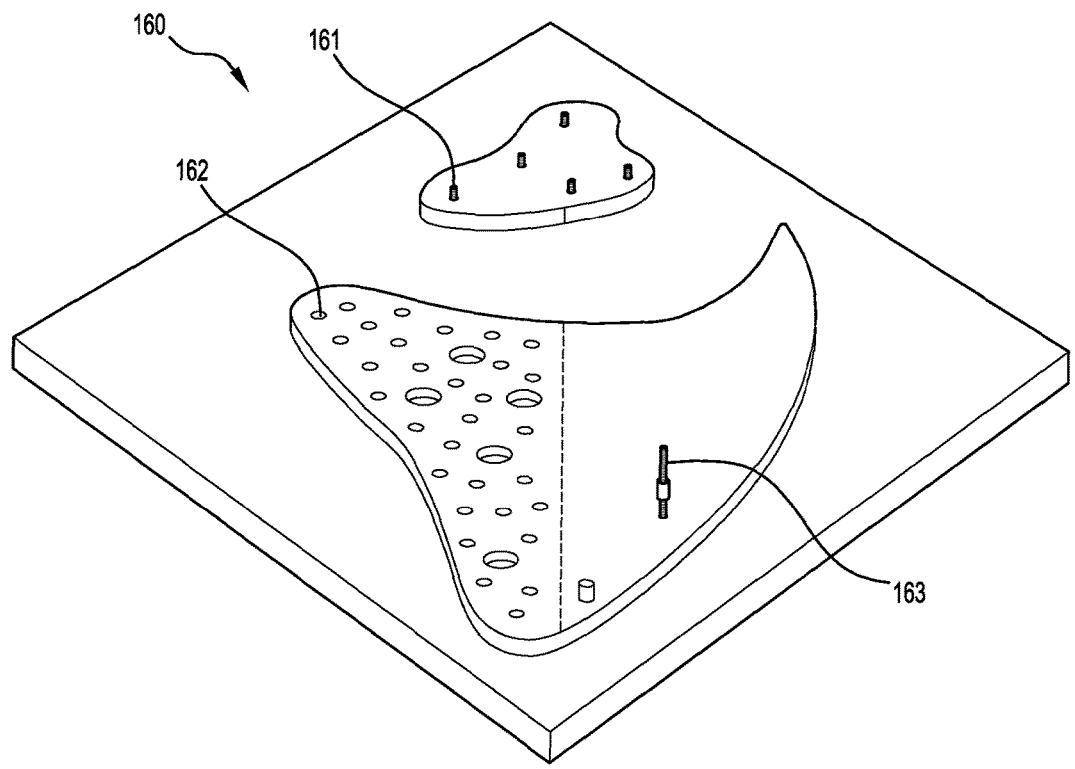
FIG. 11 is a perspective view of a fixing plate.

FIG. 11 shows a fixing plate 160 used in conjunction with the apparatus 50. The fixing plate 160 is secured to the platform 61 and provides one or more threaded fixtures 161 and/or textured regions 162 having protrusions and/or recesses, to aid engagement of the first or second material with the platform 61. The fixing plate 160 may be releasably secured to the platform 61 and permanently affixed to a fabricated object. Additional attachments, such as a threaded bar 163, are securable to the threaded fixtures 161 during the fabrication process, thereby extending the length of the fixing within a fabricated object.

Figure 12A:
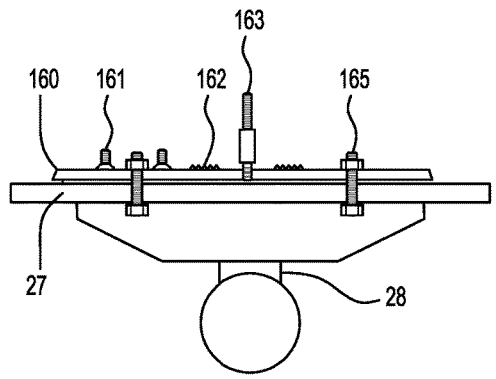
FIGS. 12A-12E are cross-section views of various stages of fabricating a further alternative object on the fixing plate shown in FIG. 11.
Figure 12B:
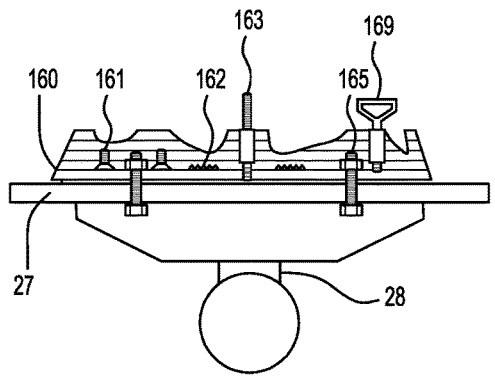
Figure 12C:
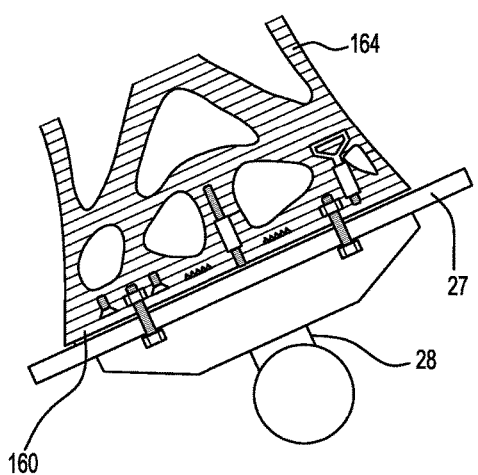
Figure 12D:
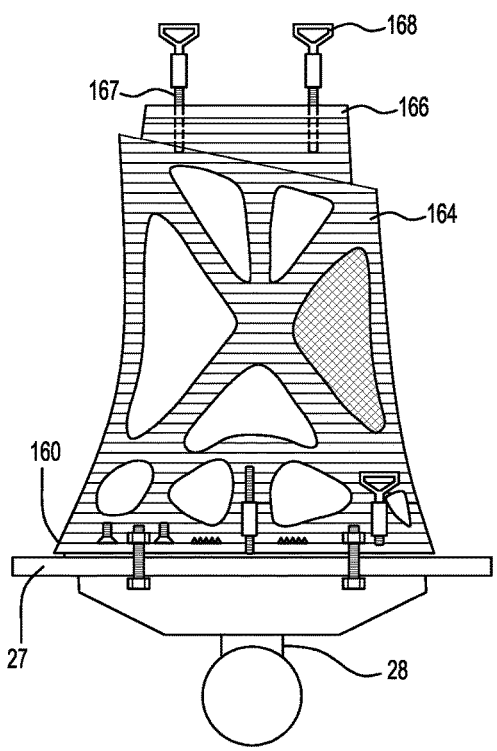
Figure 12E:
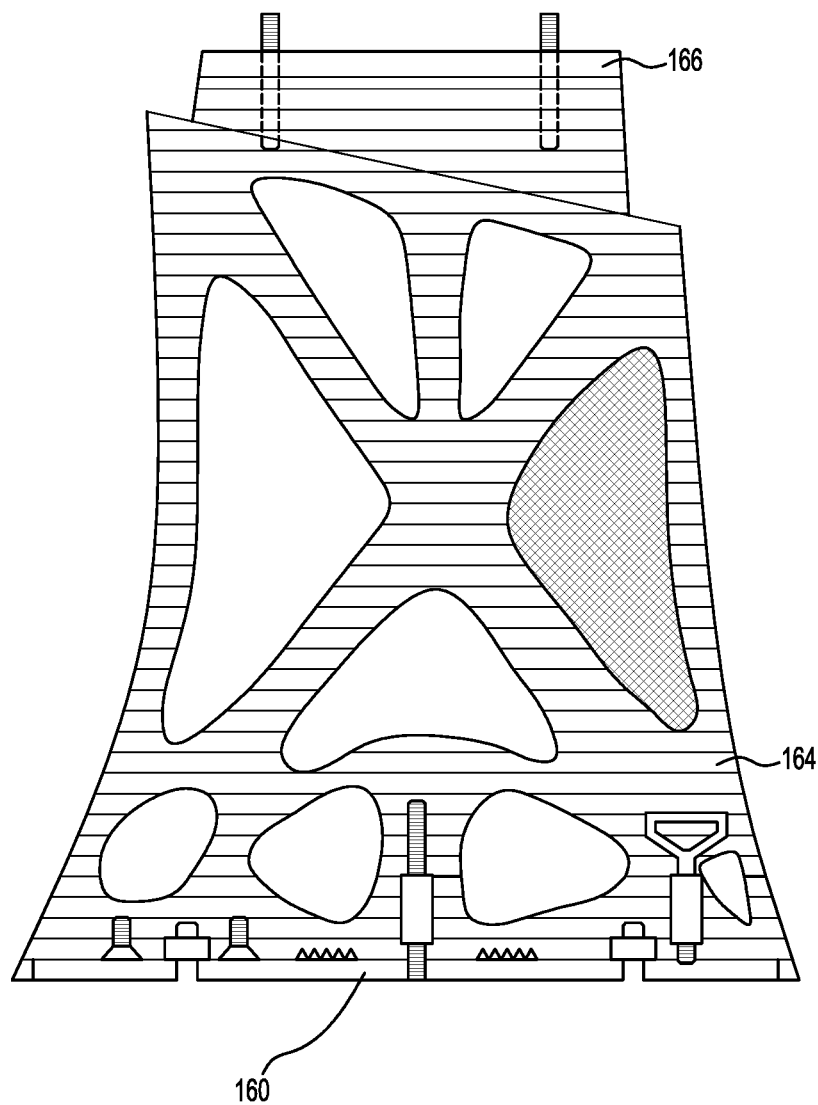

FIGS. 12A to 12E show the fixing plate 160 attached to the platform 61 during various stages of the apparatus 20 fabricating a further alternative object 164. FIG. 12A shows the fixing plate 160 connected to the platform 61 by a plurality of mechanical fasteners 165. FIG. 12B shows a number of layers of the object 164 fabricated in contact with the fixing plate 160, threaded fixtures 161 and perforated region 162. An extender rod 163 and a load spreading fixture (169) are also connected to some of the threaded fixtures 161. FIG. 12C shows a later stage of the fabrication process, where the platform 61 is rotated, thereby tilting the object 164 engaged with the fixing plate 160. FIG. 12D shows the complete object 164 having an additional fixing plate 166 connected to a top surface thereof by two additional threaded fixtures 167. Respective removable lifting fixtures 168 are connected to the threaded fixtures 167. FIG. 12E shows the object 164 removed from the platform 61 with both fixing plates 160, 166 engaged with the object 164.

It will be apparent that obvious variations or modifications may be made to the present invention in accordance with the spirit of the invention and which are intended to be part of the invention. Although the invention is described above with reference to specific embodiments, it will be appreciated that it is not limited to those embodiments and may be embodied in other forms.

The invention claimed is:

1. A method for fabricating a composite object comprising two structures using a computer-controlled apparatus, the apparatus comprising a deposition head in communication with a supply of first material, a reservoir containing a substantially liquid, curable second material, and an activation head for solidifying the second material, the activation head and deposition head being movable relative to the reservoir and selectively operable independent of each other, the method comprising the steps of:

receiving, by the apparatus, computer instructions relating to the composite object geometry;

moving and selectively operating the deposition head to deposit portions of the first material in respective specific locations, whereby the deposited portions of the first material join to each other to form a first structure corresponding with a first portion of the composite object geometry; and moving the activation head relative to the reservoir, and selectively operating the activation head to solidify portions of the second material contained in the reservoir in respective specific locations, whereby the solidified portions of the second material join to each other to form a second structure corresponding with a second portion of the composite object geometry;

wherein the steps of selectively operating the deposition head and selectively operating the activation head are executed independently of each other, and wherein the first structure and the second structure are progressively fabricated until the first structure and second structure are joined, thereby forming the composite object.

2. The method for fabricating a composite object according to claim 1, wherein the activation head and the deposition head are movable independent of each other, and wherein the steps of moving and selectively operating the deposition head and moving and selectively operating the activation head are executed independently of each other.

3. The method for fabricating a composite object according to claim 1, wherein the apparatus further comprises a platform for supporting the composite object, the platform being movable relative to the reservoir, and wherein at least one of the steps of moving and selectively operating the deposition head and moving and selectively operating the activation head further comprise fabricating at least one of the respective material portions against the platform.

4. The method for fabricating a composite object according to claim 3, comprising the further step of moving the platform relative to the reservoir, thereby moving the at least one respective material portions supported thereon.

5. The method for fabricating a composite object according to claim 3, wherein the second material defines a top surface and wherein the step of moving and selectively operating the activation head further comprises solidifying at least one of the portions of the second material at the top surface.

6. The method for fabricating a composite object according to claim 5, comprising an initial step of moving the platform above the top surface, and the step of moving and selectively operating the deposition head further comprises depositing at least one of the portions of the first material on the platform.

7. The method for fabricating a composite object according to claim 6, comprising the further step of after moving and selectively operating the deposition head, moving the platform to position the at least one portion of the first material relative to the top surface.

8. The method for fabricating a composite object according to claim 7, comprising the further step of after moving and selectively operating the activation head, moving the platform to position the composite object relative to the top surface.

9. The method for fabricating a composite object according to claim 1, wherein the steps of moving and selectively operating the deposition head and moving and selectively operating the activation head are repeated to progressively fabricate the first and second structures.

10. The method for fabricating a composite object according to claim 1, wherein the steps of moving and selectively operating the deposition head and moving and selectively operating the activation head are executed simultaneously to progressively fabricate the first and second structures.

11. The method for fabricating a composite object according to claim 4, wherein at least two of the steps of moving and selectively operating the deposition head, moving and selectively operating the activation head, and moving the platform are executed simultaneously.

12. The method for fabricating a composite object according to claim 4, wherein the platform is rotatable about at least one axis, and wherein the step of moving the platform further comprises rotating the platform.

13. A computer-controlled apparatus for fabricating a composite object, the apparatus comprising:

a deposition head in communication with a supply of first material and adapted to expel the first material therefrom;

a reservoir containing a substantially liquid, curable second material;

an activation head for solidifying the second material contained in the reservoir, the activation head being movable relative to the reservoir; and a controller configured to move and operate the activation head and the deposition head responsive to computer instructions relating to the composite object geometry;

wherein the deposition head is movable relative to the reservoir, and the deposition head and the activation head are operable independent of each other; and wherein the controller moves and selectively operates the deposition head to deposit portions of the first material in respective specific locations corresponding with a first portion of the composite object geometry, wherein the portions of the first material join to each other to form a first structure, and the controller moves and selectively operates the activation head to solidify portions of the second material contained in the reservoir in respective specific locations corresponding with a second portion of the composite object geometry, wherein the portions of the second material join to each other to form a second structure, and wherein the first structure and the second structure are progressively fabricated until the structures join and form the composite object.

14. The computer-controlled apparatus according to claim 13, wherein the deposition head and the activation head are movable independent of each other.

15. The computer-controlled apparatus according to claim 14, wherein the deposition head is secured to a first robotic arm and the activation head is second to a second robotic arm.

16. The computer-controlled apparatus according to claim 13, further comprising a platform for supporting the composite object, the platform being movable relative to the reservoir.

17. The computer-controlled apparatus according to claim 14, wherein the second material defines a top surface and the controller is configured to move the platform, and wherein the controller moves the platform relative to one or more of the activation head, the deposition head and the top surface, responsive to the computer instructions.

18. The computer-controlled apparatus according to claim 14, wherein the platform is rotatable about at least one axis, and the controller is configured to rotate the platform responsive to the computer instructions.

19. The computer-controlled apparatus according to claim 13, further comprising a spray nozzle in communication with a gas supply, and wherein the controller is configured to selectively operate the spray nozzle to expel the gas responsive to the computer instructions.

20. The computer-controlled apparatus according to claim 13, wherein the first material is a reel of fibres and the deposition head is configured to deploy the fibres, and wherein the controller is configured to selectively operate the deposition head to deploy the fibres.

21. The computer-controlled apparatus according to claim 20, wherein the deposition head is adapted to cut the reel of fibres into sections and spray the sections therefrom.

22. The computer-controlled apparatus according to claim 13, further comprising a suction nozzle in communication with a vacuum source, and wherein the controller is configured to selectively operate the suction nozzle to remove the first material from one or more of the reservoir and the composite object.

23. The computer-controlled apparatus according to claim 13, wherein the activation head further comprises an array of activation nozzles, the array being rotatable around at least one axis, and wherein the controller is configured to selectively operate each nozzle and rotate the array, responsive to the computer instructions.

24. The computer-controlled apparatus according to claim 14, further comprising a fixing plate adapted to releasably connect to the platform, the fixing plate having at least one engaging portion for engaging the composite object.

25. The computer-controlled apparatus according to claim 24, wherein the at least one engaging portion comprises a threaded fixture.

* * * * *